United States Patent
Roffet et al.

(10) Patent No.: US 9,500,939 B2
(45) Date of Patent: Nov. 22, 2016

(54) SAFETY FEATURE FOR PROJECTION SUBSYSTEM USING LASER TECHNOLOGY

(71) Applicant: STMicroelectronics International N.V., Amsterdam (NL)

(72) Inventors: Frederique Roffet, Coublevie (FR); Laurent Cuisenier, Bourgoin Jallieu (FR)

(73) Assignee: STMicroelectronics international N.V., Amsterdam (NL)

( * ) Notice: Subject to any disclaimer, the term of this patent is extended or adjusted under 35 U.S.C. 154(b) by 36 days.

(21) Appl. No.: 14/413,548

(22) PCT Filed: Jul. 17, 2013

(86) PCT No.: PCT/EP2013/065059
§ 371 (c)(1),
(2) Date: Jan. 8, 2015

(87) PCT Pub. No.: WO2014/023538
PCT Pub. Date: Feb. 13, 2014

(65) Prior Publication Data
US 2015/0177605 A1    Jun. 25, 2015

Related U.S. Application Data

(60) Provisional application No. 61/694,556, filed on Aug. 29, 2012.

(30) Foreign Application Priority Data

Aug. 6, 2012  (EP) .................................... 12305977
Jan. 24, 2013  (EP) .................................... 13305081

(51) Int. Cl.
*G03B 21/20* (2006.01)
*G03B 21/14* (2006.01)
(Continued)

(52) U.S. Cl.
CPC ....... *G03B 21/2053* (2013.01); *G03B 21/2033* (2013.01); *G03B 21/2086* (2013.01);
(Continued)

(58) Field of Classification Search
CPC ................ G03B 21/2053; G03B 21/20; G03B 21/14; H04N 9/3194; H04N 9/3155
(Continued)

(56) References Cited

U.S. PATENT DOCUMENTS

2005/0179875 A1    8/2005    Aoyanagi
2010/0177929 A1    7/2010    Kurtz et al.

OTHER PUBLICATIONS

International Search Report for PCT/EP2013/065059 mailed Sep. 12, 2013 (2 pages).
(Continued)

*Primary Examiner* — William C Dowling
*Assistant Examiner* — Ryan Howard
(74) *Attorney, Agent, or Firm* — Gardere Wynne Sewell LLP

(57) ABSTRACT

A projection subsystem includes a projector for projecting an image on a projection surface and a safety feature for tuning the projector when presence of a human is detected in front of the projection surface. This safety feature includes: —an apparatus for computing a depth view corresponding to at least a portion of the projection surface, —a camera for acquiring a captured image, —a computing circuit for detecting an object between the projector and the projection surface from this depth view and determining that the object is a human from the captured image, and a control circuit for tuning the projector accordingly.

15 Claims, 4 Drawing Sheets

(51) Int. Cl.
*H04N 9/31* (2006.01)
*G03B 17/54* (2006.01)
(52) U.S. Cl.
CPC .......... *H04N 9/3161* (2013.01); *H04N 9/3194* (2013.01); *G03B 17/54* (2013.01); *G03B 21/14* (2013.01)
(58) Field of Classification Search
USPC ......................................................... 353/97
See application file for complete search history.

(56) References Cited

OTHER PUBLICATIONS

Leskovec, Jurij et al: "Detection of Human Bodies Using Computer Analysis of a Seqence of Stereo Images," 1999, pp. 1-19.

SAFETY FEATURE FOR PROJECTION SUBSYSTEM USING LASER TECHNOLOGY

PRIORITY CLAIM

This application is a 371 filing from PCT/EP2013/065059 filed Jul. 17, 2013, which claims the benefit of United States Provisional Application for Patent No. 61/694,556 filed Aug. 29, 2012; European Application for Patent No. 12305977.6 filed Aug. 6, 2012; and European Application for Patent No. 13305081.5 filed Jan. 24, 2013, the disclosures of which are all hereby incorporated by reference.

FIELD OF THE INVENTION

The invention relates to the field of devices for projecting images on a projection screen providing eye-protection features. It is particularly adapted to laser-based image projection subsystems.

BACKGROUND OF THE INVENTION

Projectors are devices adapted for projecting image information from different sources on a surface. The image information can be still images (photographies, slides, computer displays, etc.) or moving (videos, animations, etc.) and can be provided by different sources like, for instances, a computer connected to the projection device, multimedia player (DVD, Blueray players), TV tuner, etc.

The projector subsystem can also be embedded inside a communication terminal like a smartphone, a tablet, a laptop computer, etc. and then be able to use the content of the communication system as sources and project any files stored inside the communication system. This type of projector is usually referred to as "pico-projector", and is constrained in size and power consumption so as to be embedded in a more complex system, often a handheld device.

Projectors, including pico-projectors, are often based on laser technology for projecting images. Usually, one laser per color component (red, green, blue) is used.

However, lasers (as well as light beams above a certain power) may be armful or dangerous when directed towards the eyes.

Even when warned about this potential danger, many situations can imply risks. For instance, a speaker may be so concentrated by his speech that he can enter the projection area and face the projector without noticing immediately.

The potentially risk situations even increase with handheld devices embedding pico-projectors: for instance, the user may be willing to look around for the best projection surface and then point the projection beam towards other people. Also, the handheld device can be used by children less aware of safety issues. Even malicious behaviors should be taken into account.

It appears then clearly that there is a need for safety features for projectors, especially for pico-projectors embedded in handheld devices.

Some safety solutions have been proposed to avoid projection beams being directed towards the eyes.

For instance, the patent application US2010/0177929 proposes a solution where the projector device also comprises a camera to capture the projected image. The device then analyses the image and uses face-recognition algorithms to determine if a human face (or other body features) is present and in this case switch off the projection beam.

A major drawback of this solution is the confusion that can be made between a real human face and a projected human face. The camera is unable to make this distinction and this mechanism detects the presence of a human in front of the projector each time the projected image contains a human face (or any other human body feature used to detect a human presence).

Other solutions, like the one described in the U.S. Pat. No. 6,002,505, are based on sensors measuring acoustic signals, electromagnetic radiations, infrared signals etc. They have as major drawbacks to not be robust enough and to make use of additional and costly devices to be embedded within the projection subsystem. In addition, these sensors can be subject to interferences with other devices in the vicinity.

SUMMARY OF THE INVENTION

An object of embodiments of the present invention is to alleviate at least partly the above mentioned drawbacks. More particularly, embodiments of the invention aim at improving the situation by enabling to robustly and safely projecting an image from a projection subsystem without increasing dramatically its manufacturing cost.

A first object of the invention is a method for safely projecting an image comprising steps of:
 Obtaining an image to project;
 Projecting said image on a projection surface by actuating a projector;
 Computing a depth view corresponding to at least a portion of said projection surface;
 Acquiring a captured image by a camera;
 Detecting from said depth view and said captured image if a human is in front of the projector; and
 Tuning said projector accordingly.

According to embodiments of the invention, the depth view can be computed from a pair of images provided by a pair of stereoscopic cameras.

The step of determining if a human is in front of the projector may comprise sub-steps of:
 Delimiting areas within the depth view;
 Applying a body feature recognition algorithm on the areas;
 Detecting that a human is in front of said projector when a body feature is recognized by this algorithm.

Delimiting areas within the depth view may consist in determining a base depth within this depth view corresponding to the projection surface and groups of points within the depth view, having a depth substantially different the previously determined base depth.

Tuning said projector accordingly may consist in switching it off, if a human is detected as being in front of said projector.

The body feature may be a human face and, in this case, detecting that a human is in front of said projector can consist in detecting that this human is facing the projector.

Another object of the invention is a projection subsystem comprising a projector for projecting an image on a projection surface and a safety feature for tuning the projector when a human is detected in front of it. The safety feature comprises:
 Apparatus for computing a depth view corresponding to at least a portion of the projection surface,
 Camera for acquiring a captured image,
 Computing circuits for detecting a human in front of the projector from the depth view and the captured image, and for tuning the projector accordingly.

According to embodiments of the invention, the apparatus may comprise a pair of stereoscopic cameras providing a pair of stereoscopic images from which the depth view is computed.

The computing circuits may comprise means for:

Delimiting areas within the depth view,

Applying a body feature recognition algorithm on these areas.

Detecting that a human is in front of said projector when a body feature is recognized by this algorithm.

These means may be adapted to delimit areas within said depth view by determining a base depth corresponding to the projection surface and grouping points within this depth view, having a depth substantially different from the previously determined base depth.

The safety feature can adapted to switch the projector off when a human is detected as being in front of the projector.

The camera (used for acquiring the captured image) may be one among the pair of stereoscopic cameras.

The body feature may be a human face and detecting that a human is in front of said projector may consist in detecting that the human is facing the projector.

Another object of the invention is a communication terminal comprising a projection subsystem as previously defined, potentially with any of its possible embodiments.

Another object of the invention is a computer program product comprising a computer readable medium, having thereon a computer program comprising program instructions, the computer program being loadable into a data-processing unit and adapted to cause execution of the method previously described with some variants, when the computer program is run by the data-processing unit.

Further features and advantages of embodiments of the invention will appear from the following description of some embodiments of the invention, given as non-limiting examples, with reference to the accompanying drawings listed hereunder.

DETAILED DESCRIPTION OF EMBODIMENTS OF THE INVENTION

Figure 1:
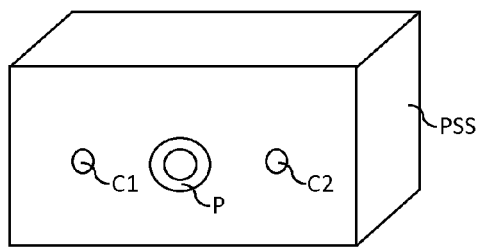
FIG. 1 shows a projection subsystem adapted to implement embodiments of the invention.

On the FIG. 1 is depicted a projection subsystem PSS adapted for projecting multimedia content (photos, videos, graphics . . . ) or textual content (texts, figure sheets . . . ) in different contexts (home entertainment, business, etc.) as still or moving images.

The images are actually projected by a projector. The projector P is an optical device which generally makes use of laser technologies. Some may uses other technologies, like LED, but they have been widely criticized for having insufficient brightness for everyday use in a normally lit room. In general, a laser-based projector uses three laser beams, one per color components (red, green, blue).

Small sized projectors, designed to be embedded in a handheld projection subsystems, are referred to as pico-projectors, mobile projectors, pocket projectors, mini-beamers etc. In order to avoid terminology confusions, we will here-below simply refer to them as "projectors" since the invention is not bound to the size of the projector.

In addition of the projector itself, the projection subsystem PSS can comprises other circuitries like Codecs, memory (for storing multimedia contents, for instance), and memory and processing means to implement various features. Among these features, the projection subsystem PSS can comprise a safety feature that will be described later.

This projection subsystem PSS can be a stand-alone device product, aiming at being put on a table, like depicted in the FIG. 1.

Figure 2:
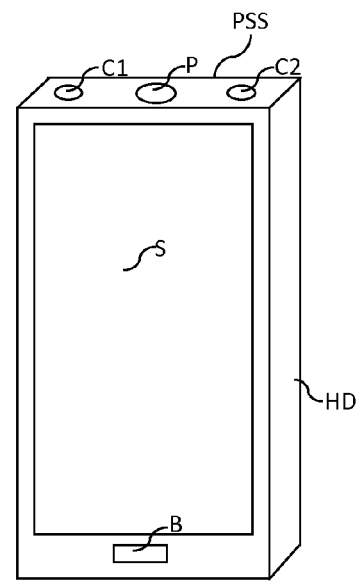
FIG. 2 shows a communication terminal adapted to implement embodiments of the invention.

It can also be a part of a communication terminal HD, like depicted in the FIG. 2. The communication terminal may be a tablet, a smartphone, a mobile phone, etc. It comprises a man-machine interface which may comprise a screen S (which is typically a touchscreen) and buttons B.

According to embodiments of the invention, the projection subsystems PSS also comprises a pair of stereoscopic cameras C1, C2. These two cameras are adapted to provide the projection subsystems PSS with a pair of stereoscopic images of a same captured view.

The cameras C1, C2 and the projector P should ideally be aligned. In case of bad alignment (or other position), an extra processing is needed to compensate it.

According to other embodiments of the invention, the projection subsystem PSS can comprise other sensors instead of or in addition to these stereoscopic cameras. As it will be explained later, the sensors should be adapted to provide data enabling the computing of a depth view of the projection surface.

For instance, these sensors can be a camera associated with a structured-light emitter. The structured light may be in the infrared domain like with the product "Kinect"™ of the company Microsoft.

It can also be a set of more than two cameras. Compared with the stereoscopic pair mentioned above, this embodiment provides the further advantage of enabling the verification by a third camera's image the depth view information deduced from a pair.

Other embodiments are possible, and the invention should not be understood as limited to any of these embodiments, notably to the pair of stereoscopic cameras on which most of the descriptions below will be based.

Figure 3:
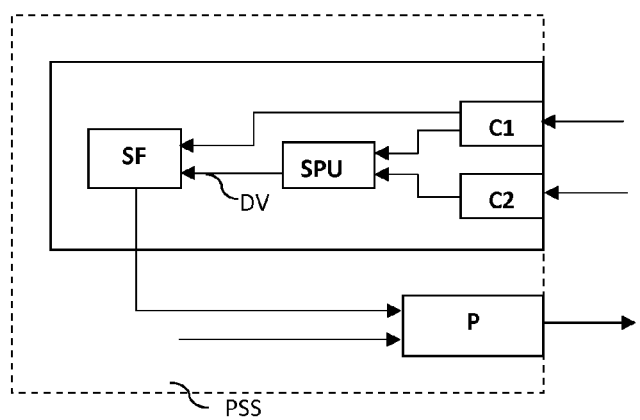
FIG. 3 represents a block diagram illustrating an exemplary configuration of a projection subsystem according to embodiments of the invention.

The FIG. 3 represents a possible high-level architecture of a projection subsystem PSS (being a stand-alone one, or embedded inside a communication terminal).

Figure 6:
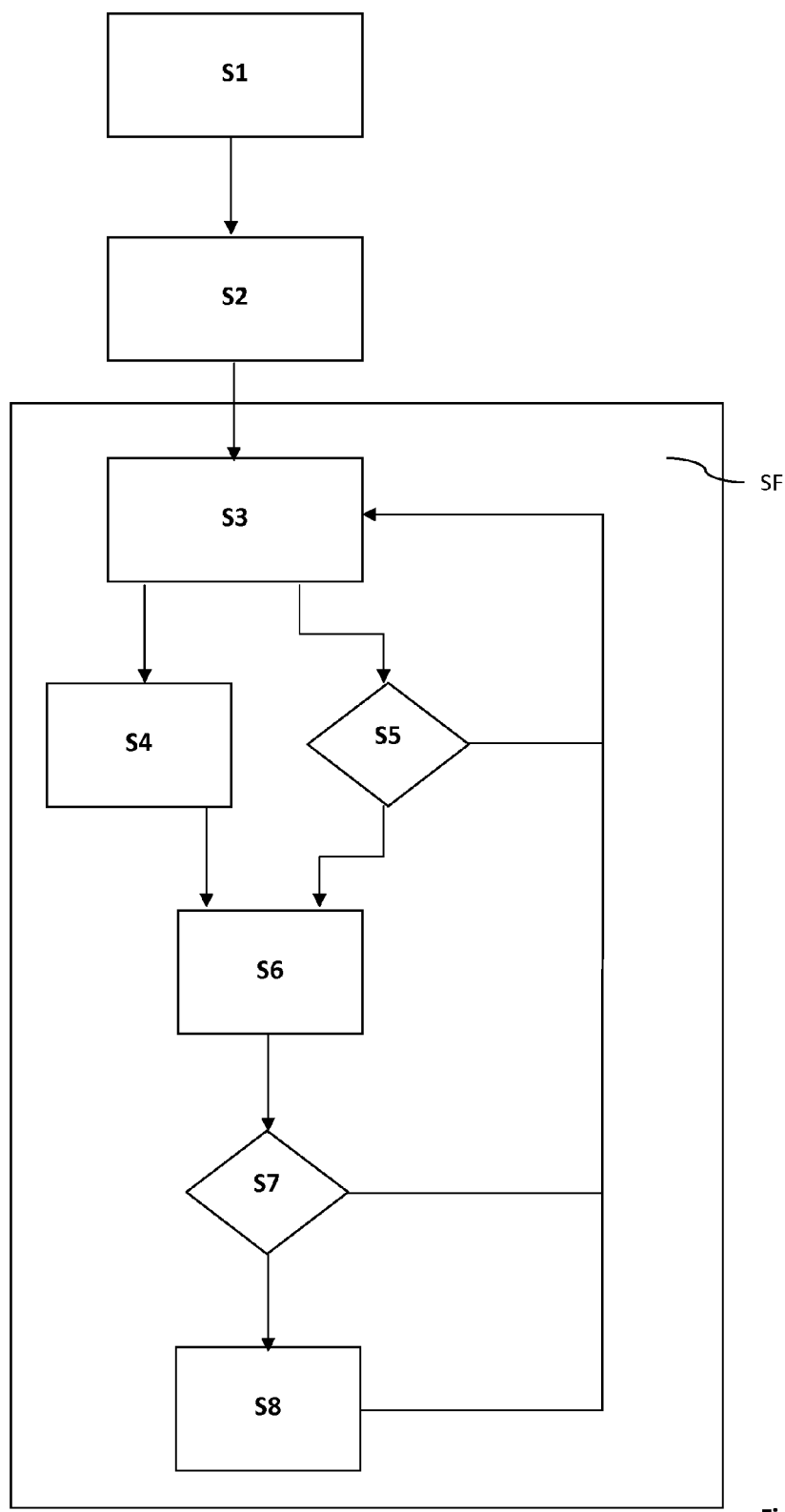
FIG. 6 represents a flow chart of a method for safely projecting an image in accordance to an embodiment of the invention.

This FIG. 3 will be described along with the flow chart represented in FIG. 6.

The projector P embedded within the projection subsystem PSS is adapted to obtain an image to project IMG at step S1.

The source of this image can be internal to the projection subsystem PSS which can comprise a internal memory (flash RAM, hard disk . . . ) to store some contents, or a removable memory (cards, USB key, etc.).

It can also be external. For instance, it can be another circuits of the terminal communication within with the projection subsystem is itself comprised. It can also be another device linked to the projection subsystem with wire-line communication means (USB, HDMI . . . ) or wireless communication means.

Once this image to project is obtained, the projector P is actuated to project this image on a projection surface, in a step S2.

The way the projector is actuated depends on the technology and on the model of the projector itself and is out of the scope of the present invention.

The projector surface can be any surface available to the user of the projection subsystem PSS. In the ideal case, it is a plan surface with an uniform clear color (white, preferably) and a smooth texture. However, in the situation where the projection system is a handheld device (including a communication terminal), the user may face different situations where he cannot find an ideal projection surface and where he should project the image on rough-texture walls, grey-colored surfaces or even non-planar surfaces.

Figure 5:
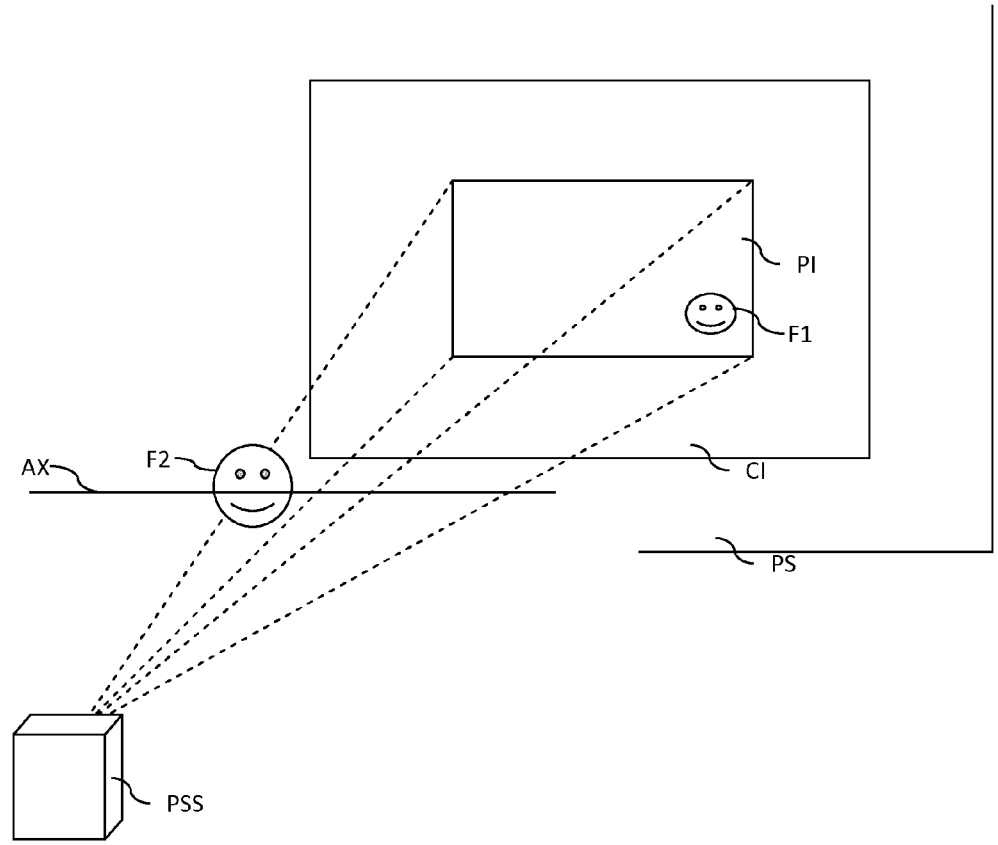
FIG. 5 illustrates the context in which a projection subsystem according to embodiments of the invention can be deployed.

On FIG. 5 is depicted a projection surface PS on which a projection subsystem PSS projects an image PI.

The projection subsystem PSS also comprise a safety feature FS for tuning the projector when a human is detected in front of the projector P.

This safety feature comprises itself some apparatuses for computing, in a step S3, a depth view DV corresponding to at least a portion of the projection surface PS.

This portion corresponds to a zone of danger, i.e. the zone where it is desirable to avoid projecting the image by actuating the laser beams in case a human is present. The size of this portion may correspond to the projected image PI surrounded by a security zone. This security zone can be a built-in parameter or tunable through a man-machine interface of the projection subsystem. It can be a percentage of the projected image and its value may depend on the actual technology of the projector P.

The portion may include an even larger zone, to strengthen the safety of the system. A larger portion may provide the further advantage to anticipate the behavior of humans who are outside a zone of danger at one moment but may enter it the second after. By taken into account humans outside the zone of actual danger, the safety feature may tune down the projector before they enter.

According to an embodiment of the invention, the depth view DV may be computed from a pair of images provided by stereoscopic cameras C1, C2 by a stereoscopic processing unit SPU within the safety function SF.

This stereoscopic processing unit SPU can implement known technologies of stereopsis or computer stereo vision. Basically, it may implement a 2-step algorithm consisting in:
  Identifying a same point within the two (stereoscopic) images, and
  Comparing the location of this same point within the two images.

Figure 7:
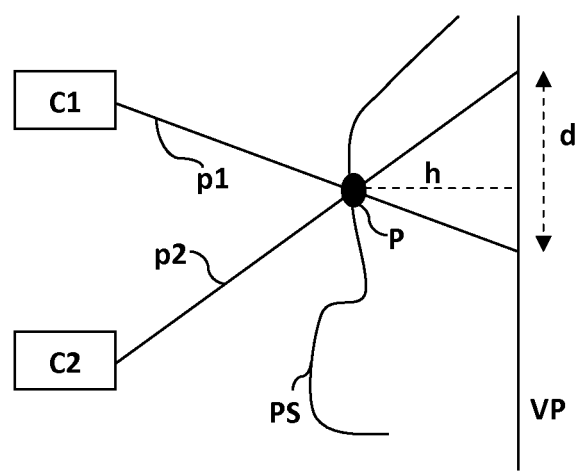
FIG. 7 represents a schematic example of computing a depth view with a pair of stereoscopic cameras.

The first step can be done for instance by using known pattern-matching algorithms. The second step can be better understood by the FIG. 7.

Two stereoscopic cameras C1, C2 takes two images of the same scene and, in particular, of a point P of the projection surface PS. As these cameras have different location, they view the point P with different angles. More concretely, the image acquired from the camera C1 shows the point P as projected along the projection line p1 onto a virtual plan VP, whereas the image acquired from the camera C1 shows this same point P as projected along the projection line p2 onto this virtual plan VP.

The distance d between the two projections on the virtual plan VP is directly representative of the depth h. This depth h represents the distance of this point P to this virtual plan VP. As this virtual plan is a parameter which can be arbitrary set, the depth h has only a relative meaning.

This relative meaning is however sufficient to estimate the shape of the projection surface PS, but iterating this process on a sufficient sample of points P. The result of these iterations provides the depth view information DV.

Many other methods and improvements are possible to implement this step of computing depth view information. The patent application US2011/0025827, for instance, teaches such a method and describes also the state of the art in this technical domain.

In the embodiment depicted in FIG. 3, the depth view is transmitted to computing circuits CC.

The computing circuits CC perform a step S5 of delimiting areas within said depth view. These areas corresponds to entities different from the projection surface PS but present in front of the projector P. They thus represent situations of risks.

Figure 4:
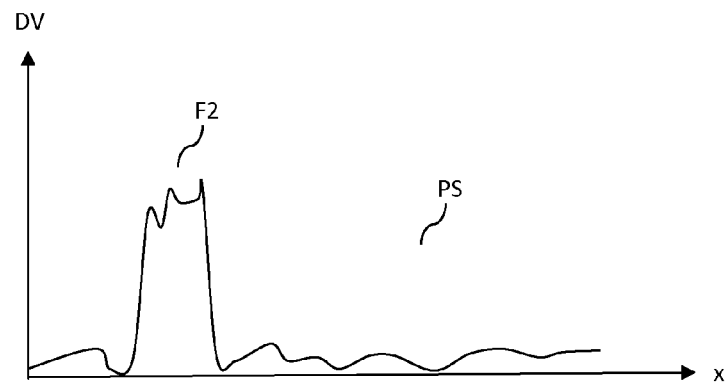
FIG. 4 shows a schematic example of a depth view, in accordance with an embodiment of the invention.

The FIG. 4 schematically represents a depth view DV corresponding to the line segment AX of the FIG. 5. According to usual convention, the lowest values correspond to the most distant points, while higher values correspond to closer points.

In real situations where the depth view is computed for a 2D projection surface (or portions of it), the depth view forms a 3D data structure. Here, in order to keep figures and explanations clear, the depth view is a 2D data structure since based on a line segment: the "real" depth view can be reconstructed by joining all horizontal line segments of the projection surface PS so as to finally get the 3D data structure.

The axis x represents the position along the line segment AX and the axis DV represents the value of the depth view for a given position.

In the scene represented in the FIG. 5, the line segment AX crosses an object F2, which is between the projection surface PS and the projector P. In the FIG. 4, the presence of this object F2 is reflected by higher values of the depth view DV. The rest of the values of the depth view corresponds to lower and substantially constant values. These values represent a base depth corresponding to the projection surface PC.

The base depth can be determined in various ways.

It can be the most represented depth view value within the considered projection surface PS.

It can also be determined as the most distant depth within the depth view (the lower value, in the example of FIG. 4).

It can also be manually set by the user.

For instance, the user can put a special marker on the projection surface to calibrate the depth view and set the base depth.

Alternatively, the user can enter the value of an (estimated) base depth, settable through the man-machine interface associated with the projection subsystem.

Still another solution: the user can be asked to capture a reference depth view when nothing else than the data projected is in the laser area risk. In this case, this is up to the end user to guarantee this capture and to enable the security system through a Man-machine interface.

Also, an image processing algorithm can be deployed in order to detect geometrical features within the depth view information which may correspond to an eligible projection surface.

Once the base depth has been determined, the computing circuits CC can delimit areas within the depth view DV which can be defined by groups of points having a depth substantially different from the base depth.

In the example of the FIG. 4, an area can be determined as corresponding to the object F2.

The value associated to the term "substantially" is a threshold value depending on the precision of the computed depth view (and also on the measurements made by the cameras C1, C2) and also set so as to avoid taking into account riddles of the projection surface PS.

Another threshold can also be considered to filter out areas of an insufficient size: a detected object only a few centimeters wide cannot be considered as being a human being and should not be considered as a potential risk.

If it is not possible do delimit any area, it can be assumed that no object are present in front of the projector P and that no risk is determined. On the FIG. 6, this situation is illustrated by the loop back from the step S5 to the step S3.

This means that a new step S3 of computing the depth view can be triggered. This enables continuously monitoring the space in front of the projector P. The start of a new step S3 can follow immediately the end of the steps S3 or S7, or, be triggered by a timer so as to have a new scan (i.e. computing of the depth view) according to a preset periodicity.

If at least one area can be delimited, it means that an object is present in front of the projector P and that there is a potential risk. However, this step S5 does not distinguish between humans and objects. For instance, a chair put in front of the projector P will be detected by this step based on the depth view. In order to provide more robustness and avoid undesirable false alarms, further steps are provided by embodiments of the invention.

Therefore, once areas have been delimited, the computing circuits CC can apply a body feature recognition algorithm on these areas in a step S6.

In a preferred embodiment of the invention, the body feature is a human face, so as to detect that a human is facing the projector P. This is particularly useful since the main danger is to avoid the laser beams to enter the eyes of the user.

The face recognition algorithms that can be used may be algorithms of the state of the art. Many such algorithms have been proposed so far, for example in the technical domain of the photography where one wishes the camera to automatically focus on the faces present in front of the camera.

Since these algorithms are well-known and widely deployed in existing products, they won't be described here.

The body recognition algorithm may take as input not only the areas previously delimited by also a captured image.

This captured image CI can be acquired by a camera (at step S4). This camera can be one among the pair of stereoscopic camera C1, C2. In the example architecture depicted in FIG. 3, the image captured by the camera C1 is used as input to the computing circuits CC.

According to the areas previously delimited from the depth view DV, the computing circuits CC can then delimit the corresponding areas within the captured image, and run the body recognition algorithm on them.

The captured image CI can represent the same portion of space than the one captured for computing the depth view. The smaller of both will form the considered space within which risk can be detected.

The step S7 consists then in detecting that a human is present in front of the camera. If no, the process can loop back to the step S3.

If yes, then a situation of risk has been determined and the step S8 consists in having the computing circuits CC sending the appropriate commands to the projector P to tune it accordingly.

"Tuning" may mean to dramatically reduce the intensity of the laser beams down to a safe level. It may also mean to shut it down completely. Other embodiments include a partial switch-off or "blanking" of the concerned part of the projected image PI which comprises the detected human (e.g. body features), like for instance described in the patent application US 2010/0177929.

In the case the projector can make use of different technologies, it may also mean that the projector P switch from the laser technology to LED technology for instance.

The process can then be back to the step S3 in order to go on scanning the risky space.

When the projector P is turned off (or tuned to reduced intensity), and if at step S7 no human is detected in front of the projector P, then the step S8 may consist in turning back the projector on, or to tune it to the normal intensity.

Turning back to FIG. 5 again, a second face F1 has been depicted. This face is a graphic element part of the projected image PI (which can be a photograph or a video). Thanks to the invention based on a computation of a depth view, this face F1 does not generate any false alarm, since the depth view DV is not impacted by any picture information of the projected image PI and since the body feature recognition algorithm is applied only on the areas firstly delimited on the basis of the depth view DV.

The invention has been described with reference to preferred embodiments. However, many variations are possible within the scope of the invention.

The invention claimed is:

1. A method for safely projecting an image comprising steps of:
    Projecting an image on a projection surface by actuating a projector;
    Computing a depth view corresponding to at least a portion of said projection surface;
    Acquiring a captured image by a camera;
    Detecting from said depth view and said captured image a presence of a human between said projector and the projecting surface, wherein detecting comprises:
        delimiting at least one area within said depth view;
        applying a body feature recognition algorithm on an area of said captured image corresponding to said delimited area; and
        determining that the human is present and located between said projector and the projecting surface when a body feature of the human is recognized; and
    Tuning said projector in response to the detection.

2. The method of claim 1, wherein said depth view is computed from a pair of images provided by a pair of stereoscopic cameras.

3. The method of claim 1, wherein the step of delimiting comprises determining a base depth within said depth view corresponding to said projection surface and grouping points within the depth view having a depth substantially different from said base depth as part of the delimited area.

4. The method of claim 1, wherein the step of tuning comprises switching the projector off.

5. The method of claim 1, wherein the body feature is a human face and wherein the step of detecting comprises detecting that said human face is facing said projector.

6. A projection subsystem comprising:
a projector for projecting an image on a projection surface; and
a safety feature for tuning said projector when a human is detected between the projection surface and said projector,
wherein said safety feature comprises:
an apparatus for computing a depth view corresponding to at least a portion of said projection surface,
a camera system for acquiring a captured image, and
a computing circuit for delimiting at least one area of said depth view corresponding to a portion of the depth view located closer to the projection subsystem than said projection surface, applying a body feature recognition algorithm on an area of the captured image corresponding to said delimited area, determining that the area of the captured image includes a human positioned between the projection surface and said projector and tuning said projector in response to said determination.

7. The projection subsystem according to claim 6, wherein said apparatus comprises a pair of stereoscopic cameras providing a pair of stereoscopic images from which said depth view is computed.

8. The projection subsystem according to claim 6, wherein delimiting at least one area comprises determining a base depth corresponding to said projection surface and grouping points within said depth view having a depth substantially different from said base depth as part of the delimited area.

9. The projection subsystem according to claim 6, wherein tuning comprises switching said projector off.

10. The projection subsystem according to claim 7, wherein said camera system is one among said pair of stereoscopic cameras.

11. The projection subsystem according to claim 6, wherein said body feature is a human face detected facing said projector.

12. A computer program product comprising a non-transitory computer readable medium, having thereon a computer program comprising program instructions, the computer program being loadable into a data-processing unit and adapted to cause execution of a method for safely projecting an image when the computer program is run by the data-processing unit, wherein the method comprises:
obtaining an image to project;
projecting said image on a projection surface by actuating a projector;
computing a depth view corresponding to at least a portion of said projection surface;
acquiring a captured image by a camera;
detecting from said depth view and said captured image a presence of a human between said projector and the projecting surface, wherein detecting comprises:
delimiting an area within said depth view;
applying a body feature recognition algorithm on an area of the captured image corresponding to said delimited area; and
determining that a human is between said projector and the projecting surface when a body feature is recognized; and
tuning said projector in response to the detection.

13. The computer program product of claim 12, wherein the step of delimiting comprises determining a base depth within said depth view corresponding to said projection surface and groups of points within the depth view having a depth substantially different from said base depth as part of the delimited area.

14. The computer program product of claim 12, wherein the step of tuning comprises switching the projector off.

15. The computer program product of claim 12, wherein the body feature is a human face and wherein the step of detecting comprises detecting that said human face is facing said projector.

* * * * *